United States Patent
Mayer et al.

(10) Patent No.: US 12,326,831 B2
(45) Date of Patent: Jun. 10, 2025

(54) SYSTEM ON A CHIP AND METHOD FOR OPERATING A SYSTEM ON A CHIP

(71) Applicant: Infineon Technologies AG, Neubiberg (DE)

(72) Inventors: Albrecht Mayer, Deisenhofen (DE); Patrik Eder, Taufkirchen (DE); Kajetan Nuernberger, Munich (DE)

(73) Assignee: Infineon Technologies AG, Neubiberg (DE)

( * ) Notice: Subject to any disclaimer, the term of this patent is extended or adjusted under 35 U.S.C. 154(b) by 576 days.

(21) Appl. No.: 17/679,330

(22) Filed: Feb. 24, 2022

(65) Prior Publication Data
US 2023/0267094 A1    Aug. 24, 2023

(51) Int. Cl.
*G06F 15/78*    (2006.01)
*G06F 9/30*    (2018.01)
*G06F 9/455*    (2018.01)

(52) U.S. Cl.
CPC ...... *G06F 15/7807* (2013.01); *G06F 9/30003* (2013.01); *G06F 9/45558* (2013.01); *G06F 2009/45591* (2013.01)

(58) Field of Classification Search
CPC ............. G06F 15/7807; G06F 9/30003; G06F 9/45558; G06F 2009/45591
See application file for complete search history.

(56) References Cited

U.S. PATENT DOCUMENTS

| | | | |
|---|---|---|---|
| 7,257,654 B1* | 8/2007 | Reeves | G01R 31/318555 326/38 |
| 10,146,964 B1* | 12/2018 | Shah | G06F 21/76 |
| 2010/0303239 A1* | 12/2010 | James | G06F 11/3656 711/E12.008 |
| 2011/0179309 A1* | 7/2011 | Pathirane | G06F 11/3648 714/E11.029 |
| 2012/0159478 A1* | 6/2012 | Spradlin | G06F 9/45558 718/1 |
| 2016/0349326 A1* | 12/2016 | Grafton | G01R 31/31705 |
| 2017/0371769 A1* | 12/2017 | Merten | G06F 11/301 |

OTHER PUBLICATIONS

Texas Instruments Inc. "KeyStone Architecture Memory Protection Unit (MPU)" Published Jun. 2013.

* cited by examiner

*Primary Examiner* — Wissam Rashid
(74) *Attorney, Agent, or Firm* — Eschweiler & Potashnik, LLC

(57) ABSTRACT

In various examples, a system on a chip is provided that is configured to be operated in a debug mode. The system on a chip includes a plurality of processor cores including a plurality of virtual machines and a further processor core, configured to, in the debug mode, initially execute first debug instructions after the system on a chip has started operating. The first debug instructions are configured to cause the further processor core to make a debug setting that, after the first debug instructions are executed, prevents a processor core executing second debug instructions from accessing at least one of the virtual machines and allows the processor core executing the second debug instructions to access at least one other of the virtual machines.

26 Claims, 12 Drawing Sheets

FIG. 4
Part 1/2

FIG. 5 – Part 1/7 a)

TMUX trace source control
MUX TMUX trace source control
Offset address: 00014H
Reset values: see table c)

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| TM3_P | 0 | | | TMUX3 | | | | TM2_P | 0 | | | TMUX2 | | | |
| w | r | | | rw | | | | w | r | | | rw | | | |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| TM1_P | 0 | | | TMUX1 | | | | TM0_P | 0 | | | TMUX0 | | | |
| w | r | | | rw | | | | w | r | | | rw | | | |

| Field | Bits | Type | Description |
|---|---|---|---|
| TMUX0 | 3:0 | rw | Trace source selection 0<br>Determines which trace source is seen by POBx.<br>Can be changed only if TM0_P is simultaneously '1' and the MUXLOCK.LOCK register bit is not set. |
| TM0_P | 7 | w | Trace source selection 0 protection<br>Determines whether TMUX0 is changed by writing<br>0 B TMUX0 is not changed.<br>1 B TMUX0 has new value written to it. |
| ... | ... | ... | ... |
| TMUX3 | 27:24 | rw | Trace source selection 3<br>Determines which trace source is seen by POBw.<br>Can be changed only if TM3_P is simultaneously '1' and the MUXLOCK.LOCK register bit is not set. |
| TM3_P | 15 | w | Trace source selection 3 protection<br>Determines whether TMUX3 is changed by writing<br>0 B TMUX3 is not changed.<br>1 B TMUX3 has new value written to it. |

FIG. 5 — Part 2/7 b) Access mode limitations *MUX* according to descending priority

| Mode name | Access mode | | Description |
|---|---|---|---|
| Write 1 to TM0_P and MUXLOCK.LOCK == 0 | rw | TMUX0 | TMUX0 selection protection |
| Write 1 to TM1_P and MUXLOCK.LOCK == 0 | rw | TMUX1 | TMUX1 selection protection |
| Write 1 to TM2_P and MUXLOCK.LOCK == 0 | rw | TMUX2 | TMUX2 selection protection |
| Write 1 to TM3_P and MUXLOCK.LOCK == 0 | rw | TMUX3 | TMUX3 selection protection |
| (default) | r | TMUX0, TMUX1, TMUX2, TMUX3 | | c) Reset values of MUX

| Reset type | Reset value | Remark |
|---|---|---|
| Trace Reset | 0000 0000H | |
| Kernel Reset | 0000 0000H | MCDS Kernel Reset |

FIG. 5 — Part 3/7 d) 
d) TCMUX and SRI trace source control
Controls the TCMUX trace source selection, the reference time
signal source selection and the data of the simultaneous SRI read vs
write access operations.
MUXTCRC offset address: 00020H
TCMUX and SRI trace source control reset values: see table f)

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
| | 0 | | | RC_P | | 0 | | RC | SRIR DWR _P | | 0 | SRIR DWR 3 | SRIR DWR 2 | SRIR DWR 1 | SRIR DWR 0 |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| TCMUX_P | | | | 0 | | | PPU MUX | TCMUX3 | | TCMUX2 | | TCMUX1 | | TCMUX0 | |

| Field | Bits | Type | Description |
|-------|------|------|-------------|
| TCMUXz (z=0-3) | 2*z+ 1:2*z | rw | TCMX Trace source selection<br>Determines the TCMUX trace source selection<br>Can be changed only if TMUX_P is simultaneously '1'<br>and the MUXLOCK.LOCK register bit is not set.<br>00 B CPUz<br>01 B internal monitoring<br>10 B not used<br>11 B CPUz_MEMSlave (PSPR, DSPR ...) |
| PPUMUX | 8 | rw | Determines the TCMUX trace source selection<br>Can be changed only if TMUX_P is simultaneously '1'<br>and the MUXLOCK.LOCK register bit is not set.<br>0 B PPU RTT<br>1 B internal monitoring |
| TCMUX_P | 15 | w | Trace source selection protection<br>Determines whether TMUX0 is changed by writing<br>0 B TCMUXz is not changed.<br>1 B TCMUXz has new value written to it. |

FIG. 5 – Part 4/7

Table d) continued

| Field | Bits | Type | Description |
|---|---|---|---|
| SRIRDWRz (z=0-3) | z+16 | rw | Selection of SRI data read or write<br>Defines whether the data are traced by SRI read or write access operations.<br>Can be changed only if SRIRDWR_P is simultaneously '1' and the MUXLOCK.LOCK register bit is not set.<br>0 B data from SRI write access are traced.<br>1 B data from SRI read access are traced. |
| SRIRDWR_P | 23 | w | Protection for selection of SRI data read or write<br>Determines whether SRIRDWRz is changed by writing<br>0 B SRIRDWRz is not changed.<br>1 B SRIRDWRz has new value written to it. |
| RC | 24 | rw | Reference time signal generator selection<br>Determines which source is used as reference time signal by the TSU.<br>0 B reference is fSOURCE0/24 (REFCLK1).<br>1 B reference is fSOURCE1/24 (REFCLK2). |
| RC_P | 27 | w | Reference time signal generator selection protection<br>Determines whether RC is changed by writing to this register<br>0 B RC is not changed.<br>1 B RC has new value written to it. |

FIG. 5 – Part 5/7 e) Access mode limitations MUXTCRC according to descending priority

| Mode name | Access mode | | Description |
|---|---|---|---|
| Write 1 to .TCMUX_P and MUXLOCK.LOCK == 0 | rw | PPUMUX, TCMUXz (z=0-3) | TCMUX selection protection |
| Write 1 to SRIRDWR_P | rw | SRIRDWRz (z=0-3) | SRI read or write protection |
| Write 1 to RC_P | rw | RC | Reference time signal generator selection protection |
| Write 1 to .TM3_P and MUXLOCK.LOCK == 0 | rw | TMUX3 | TMUX3 selection protection |
| (default) | r | PPUMUX, RC, SRIRDWRz (z=0-3), TCMUXz (z=0-3) | | f) Reset values of MUXTCRC

| Reset type | Reset value | Remark |
|---|---|---|
| Trace Reset | 0000 0000H | |
| Kernel Reset | 0000 0000H | MCDS Kernel Reset |

FIG. 5 – Part 6/7 g) Trace source selection locking
Write access to the MUX and MUXTCRC registers have no effect if the LOCK bit is set. This means that the configuration of the TMUX and TCMUX trace multiplexers cannot be changed at a later time after the LOCK bit is set.

| Field | Bits | Type | Description |
|---|---|---|---|
| LOCK | 0 | rw | Trace source selection locking<br>0 B LOCK is not changed.<br>1 B LOCK is set and remains set until it is cleared by a reset. |

FIG. 5 – Part 7/7 h)

Access control and PROT register
Register A for allowing write access
Defines for which master TAG ID codings write access
to the protected area is possible or prohibited
ACCEN_WRA write access enable register A
Offset address: 000C0H
Application reset value: 1000 0003H

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| EN31 | EN30 | EN29 | EN28 | EN27 | EN26 | EN25 | EN24 | EN23 | EN22 | EN21 | EN20 | EN19 | EN18 | EN17 | EN16 |
| rw | rw | rw | rw | rw | rw | rw | rw | rw | rw | rw | rw | rw | rw | rw | rw |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| EN15 | EN14 | EN13 | EN12 | EN11 | EN10 | EN09 | EN08 | EN07 | EN06 | EN05 | EN04 | EN03 | EN02 | EN01 | EN00 |
| rw | rw | rw | rw | rw | rw | rw | rw | rw | rw | rw | rw | rw | rw | rw | rw |

| Field | Bits | Type | Description |
|---|---|---|---|
| ENq (q=00-31) | q | rw | Allow write access for master TAG ID q<br>Allows write access to the protected area for transactions with the master TAG ID q<br>0 B write access deactivated<br>1 B write access activated |

SYSTEM ON A CHIP AND METHOD FOR OPERATING A SYSTEM ON A CHIP

TECHNICAL FIELD

The invention relates to a system on a chip (SoC) and to a method for operating a system on a chip.

BACKGROUND

In relation to virtualization, a system (e.g. a microcontroller) having multiple processor cores can be partitioned into multiple virtual machines (VM), each of which can comprise one or more of the processor cores. Additionally, it is possible for a single processor core to comprise multiple VMs, with the result that this single processor core can accordingly execute multiple isolated software applications.

Such a system, also referred to as a "system on a chip", can allow complex (real-time) hardware systems critical to (operating) safety to be controlled or regulated.

The execution of software (SW) in various independent VMs can simplify isolation of the software, which is attractive for safety reasons.

BRIEF DESCRIPTION OF DRAWINGS

Examples of the invention are shown in the figures and are explained in more detail below.

DETAILED DESCRIPTION

The disclosure uses the terms "safety" and "security". In this regard, "safety" denotes operating safety, that is to say that a system is operated in a state in which its use causes damage neither to the system itself nor to its surroundings (e.g. a user or another system), that is to say that a detrimental interaction is avoided. "Security", on the other hand, relates to data security. That is to say that it relates to access to data and/or functions, which can be provided, or performed, by a system, being allowed only for people with access permissions, that is to say for example to an attack being prevented.

The concept of virtualization, where typically a so-called hypervisor (HV) manages the VMs, is also increasingly implemented, as already indicated above, such that the VMs and the HV are integrated on the same hardware (HW), e.g within a single chip.

Although this saves costs, it complicates both operating safety and data security.

Figure 1:
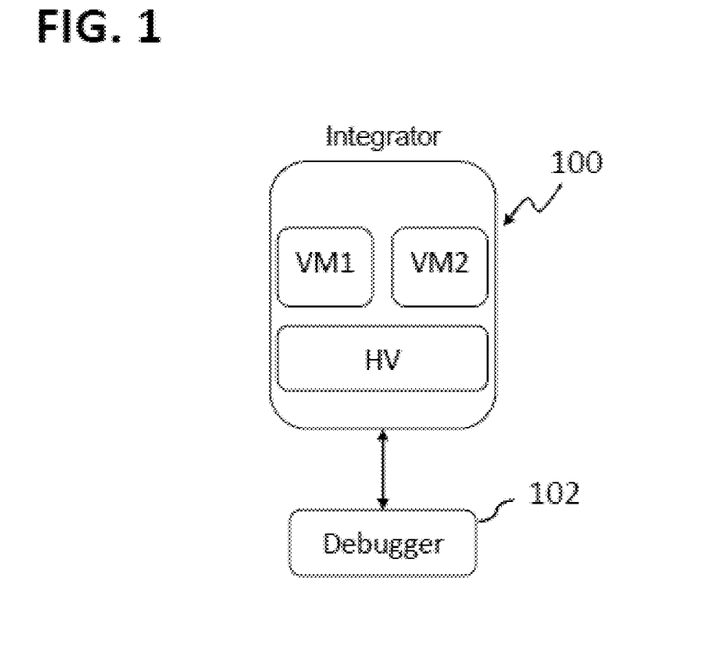
FIG. 1 shows a schematic illustration of a system on a chip and a debugger during an integration by a privileged user.

Frequently, as shown in FIG. 1, for example, a system has a first virtual machine VM1, a second virtual machine VM2 and a hypervisor HV. VM1 is intended to execute the application A, VM2 the application B, and the hypervisor HV is supposed to manage/control both.

However, it can frequently be unacceptable for every software developer, e.g. of the application A, to be provided with the full information and opportunities for analysis for the application B. By way of example, the application B may be an application from the cybersecurity domain (CS application, such as e.g. a Secure Hardware Extension (SHE+) emulation) or a piece of software from a direct competitor, with the result that maintaining data security and/or protecting intellectual property requires a person developing or debugging the application A to be prevented from gaining access to the application B (and naturally, if necessary, also vice versa).

Figure 2:
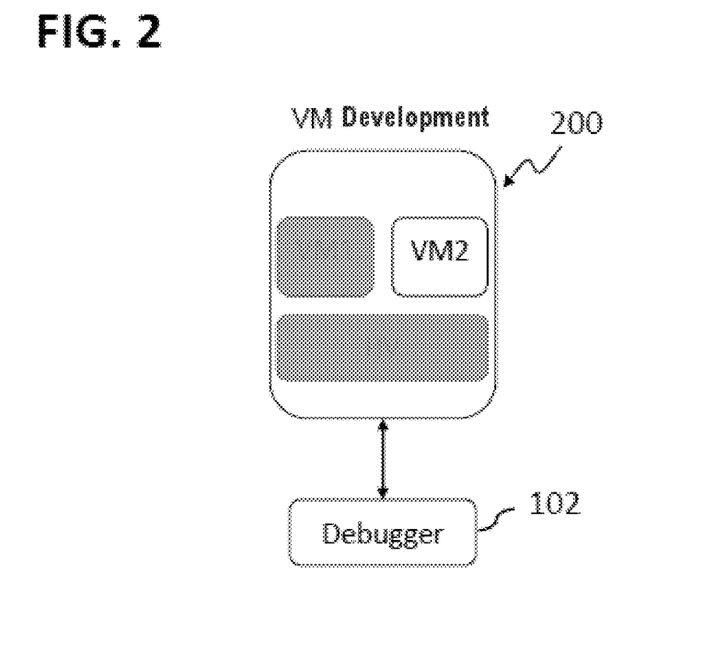
FIG. 2 shows a schematic illustration of a system on a chip and a debugger during a development of an application on a virtual machine.

Often, software applications from different suppliers are integrated in different VMs in a system (e.g. an SoC used by car manufacturers), and the whole system fails directly after installation, even though both applications worked during development (shown in FIG. 2 for an application B integrated in the VM2 by way of illustration) when they were provided alone on the chip. Naturally, in such a situation, the developer of application B does not wish to permit the developer of application A to access its software.

The manufacturer may possibly have access to both VMs/both applications, but it may possibly lack the know-how to debug one of the applications (or both).

Often, virtualization is used for large application-core based systems (e.g. from Intel, AMD x86 or ARM A series), which also largely separate the different VMs in terms of hardware.

In such cases, the debugging is typically performed in monitor based fashion. The debug monitor is then a piece of software that runs within the same VM context and therefore does not constitute any additional risk in terms of data security.

Although embedded systems having higher real-time demands could use a similar approach in principle, there are various reasons for obstruction.

By way of example, a debugging of real-time systems can be very complex if the debugging alters/influences the time management. While a debugging of the execution control with breakpoints and single step tracking may be acceptable in early phases of development, this is not appropriate in later phases of the development of a so-called "hard" real-time system.

Further, the resources of an embedded system are typically limited, with the result that a large debug monitor is not implementable, or is implementable with difficulty.

Furthermore, such a system typically has a memory protection system (MPU), instead of the otherwise customary memory management system (memory management unit (MMU)). An MPU based system presents a much greater challenge if a robust and generally applicable debug monitor needs to be provided.

Additionally, there are many different operating systems, and such a debug monitor is operating system specific in each case.

And finally, it is typically necessary for the debug monitor to cooperate with the hypervisor or to be a part of the HV, with the result that the debug monitor even needs to be adapted more specifically still, namely to suit the operating system in the combination with the hypervisor. The providers of the debugger, the operating system and the hypervisor are typically three different companies, which makes it technically and economically difficult to find a good solution.

In various examples, a system on a chip is provided that allows a debugger to access a virtual machine of the system on a chip and allows access to at least one additional virtual machine integrated in the system on a chip to be prevented.

In various examples, a privileged user (also referred to as system integrator) may be permitted to prepare the system on a chip by activating protective mechanisms. This allows restrictions to be stipulated that are implemented by an on-chip security system.

The SoC may be designed to allow access by a "normal" user, e.g. a debugger user, only when the protective mechanisms are activated.

It is thus possible, in various examples, to allow the system integrator to control read and write permissions for the virtual machines, and to allow a developer of software executed on one of the virtual machines to have the opportunity to obtain debug information.

In various examples, the SoC may be designed such that adaptation of the debugger to suit a specific operating system and/or hypervisor is superfluous.

In various examples, the SoC may be designed for a trace based debugging, with the result that it is possible to avoid debug artefacts owing to different time-related behaviour during the debugging of the execution control.

In various examples, the system on a chip may be designed to be operated in a debug mode. In this case, one of the processor cores may be designed so as, in the debug mode, to initially start only a piece of debug configuration software (referred to herein interchangeably as "first debug instructions") after the system on a chip has started operating. The debug configuration software may be designed to make a debug setting that, after the debug configuration software has been terminated, prevents a piece of debugger software (referred to herein interchangeably as "second debug instructions") from accessing at least one of the virtual machines and allows the piece of debugger software to access at least one other of the virtual machines.

In various examples, at least one part of the debugger (e.g of a piece of debugger software or either the first debug instructions or second debug instructions) can or may be provided as part of the system on a chip.

In various examples, the part of the debugger that is integrated in the SoC can allow fine-grained access control, protected in terms of data security, to registers and memories of the SoC.

In various examples, the system on a chip can further comprise a trace system (e.g., a piece of tracing software) that supports said access control, (e.g., on a VM level).

In various examples, one part of the trace system may be configurable by means of the secure access control integrated in the SoC, and another part by means of an external part of the debug software.

In various examples, the privileged system integrator can prepare a protection and debug system configuration having limited access rights and trace capabilities in an integration phase of the system on a chip. The SoC may be designed to enforce the limitations by means of an on-chip cyber security system (CSRM).

Application developers can thus be allowed to use a conventional (e.g. debug interface (e.g. DAP/JTAG) based) debugger, which has access only to memory and to peripheral devices, or peripheral circuits, enabled by the system integrator, to debug a software application on one of the virtual machines.

In various examples, the system integrator can allow for example an unlimited multicore debug system tracing of the virtual machine to be debugged on the CPUs and state and signal traces of relevant peripheral modules, or peripheral circuits, for example by defining a (read) access area on slave interfaces of local memories of the CPU.

In the detailed description that follows, reference is made to the appended drawings, which form part of this description and which show specific embodiments in which the invention can be executed for the purpose of illustration. In this respect, directional terminology such as "at the top", "at the bottom", "at the front", "at the rear", "front", "rear" etc. is used with reference to the orientation of the figure(s) described. Since components of embodiments can be positioned in a number of different orientations, the directional terminology is used for the purpose of illustration and is in no way restrictive. It goes without saying that other embodiments can be used and structural or logical changes made without departing from the scope of protection of the present invention. It goes without saying that the features of the various illustrative embodiments described herein can be combined with one another unless specifically stated otherwise. The detailed description that follows should therefore not be regarded as restrictive, and the scope of protection of the present invention is defined by the attached claims.

Within the context of this description, the terms "connected" and "coupled" are used to describe both a direct and an indirect connection and a direct or indirect coupling. In the figures, identical or similar elements are provided with identical reference signs where expedient.

Throughout this description the term "software" is used as a shorthand notation for non-transitory computer-readable medium storing computer-executable instructions that when executed by a processor, processor core, or computer cause the processor, processor core, or computer to perform various functions or operations. The term "instruction" is shorthand notation for computer-executable instructions stored in non-transitory computer-readable medium. The computer-executable instructions may be stored in computer-readable medium that is integral (e.g., on-chip) to the system on a chip or external to the system on a chip (e.g., part of an integrated circuit, package, or system that includes the system on a chip).

In various examples, the opportunity to make a setting for a protection and debug system is provided during an integration phase of multiple virtual machines that are integrated in a system on a chip by a privileged user (also referred to as system integrator), with the result that said system has limited access rights and trace capabilities. Related limitations can be enforced by means of a security system integrated in the chip (on-chip cybersecurity system CSRM).

In other words, a privileged piece of software (e.g., executable instructions) that runs (e.g., by a processor core) first after a reset for an SoC may be designed to stipulate certain settings in a trace system that are unable to be changed again later (until the next reset), the remainder of the trace system being able to be freely programmable.

Application developers can then use conventional debug interface based (e.g. DAP/JTAG based) debug applications, said application developers merely having access to memory and to peripheral devices, or peripheral circuits, that the system integrator has enabled.

If only one of the virtual machines needs to be protected against access, a developer of the software installed there can be provided with the function of the system integrator. An area of responsibility of the system integrator relates to provision of a debug environment for application developers that, when required, provides a data-secure environment for applications that are not currently being debugged.

Figure 3:
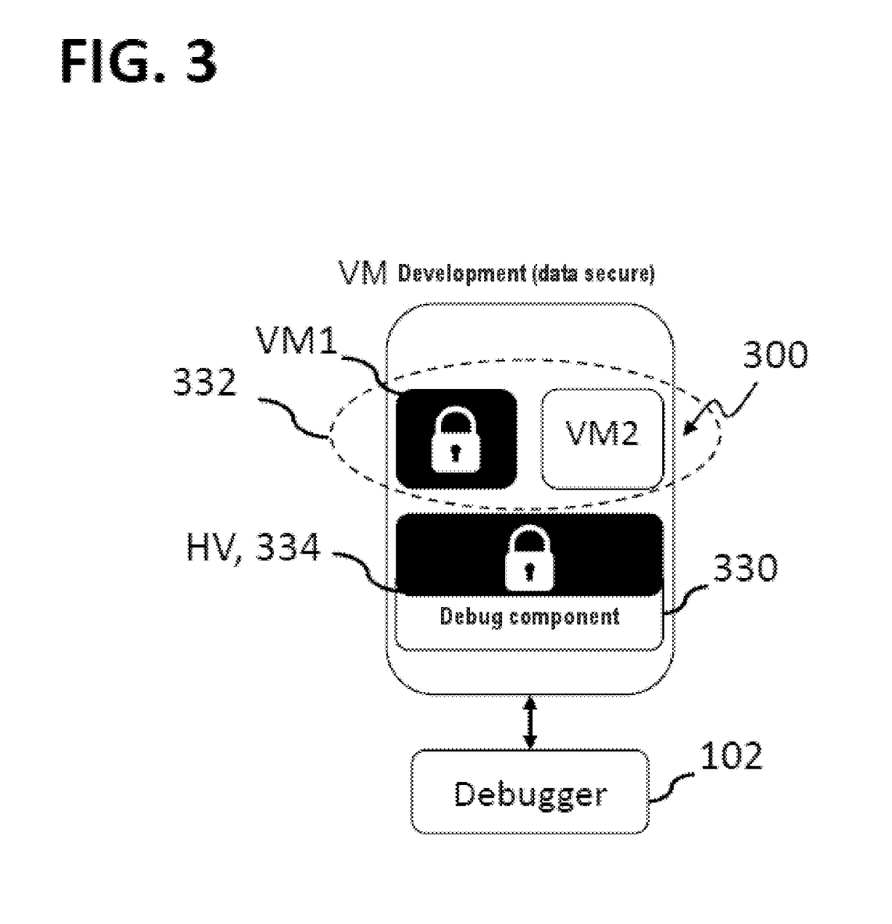
FIG. 3 shows a schematic illustration of an example system on a chip and of a debugger during a debug process, in accordance with various aspects described.
Figure 4:
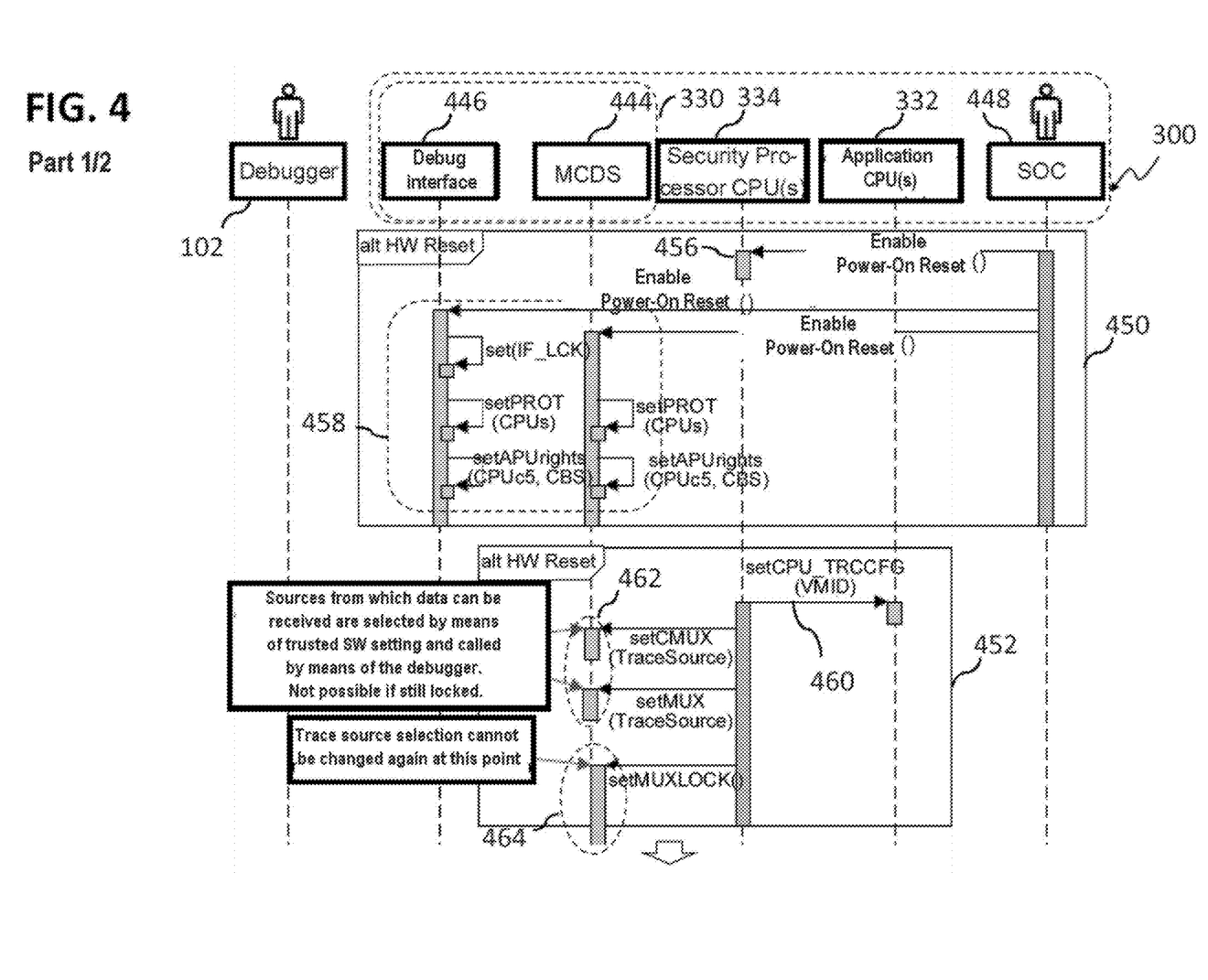
FIG. 4 shows a flowchart for an example debug process for a system on a chip, in accordance with various aspects described.

FIG. 3 shows a schematic illustration of a system on a chip 300 according to various examples and of a debugger 102 during a debug process. FIG. 4 shows a flowchart for a debug process for a system on a chip 300 according to various examples.

The system on a chip 300 may be designed to be operated in a debug mode.

The debug mode is also shown in FIG. 4, which shows a flowchart for a debug process for a system on a chip 300 according to various examples.

The system on a chip 300 can comprise a plurality of processor cores 332, which comprise a plurality of virtual machines (two virtual machines by way of illustration here, namely the first virtual machine VM1 and the second virtual machine VM2).

The system on a chip 300 can further comprise a further processor core 334, which may be designed so as, in the debug mode, to initially start only a piece of debug configuration software (e.g., execute first debug instructions) after the system on a chip has started operating (also referred to as power-on reset).

The further processor core 334 may be for example a hardware security module (HSM) (referred to as security processor in FIG. 4 and as CSRM above). The further processor core 334 may be designed to load a piece of starting software or starting instructions (shown at 456), for example from a memory, e.g. a ROM. The debug configuration software (e.g., first debug instructions) may be part of the starting software or starting instructions or designed to be started by the starting software or starting instructions.

In various examples, the first debug instructions may be configured to cause the further processor core 334 to make a debug setting that, after the first debug instructions have been executed, prevents a processor core executing second debug instructions (e.g., the debugger 102) from accessing at least one of the virtual machines VM1 or VM2 and allows processor core executing second debug instructions (e.g., the debugger 102) to access at least one other of the virtual machines (the other from VM1 and VM2).

FIG. 4 shows (at 458) that the further processor core 334 may be designed so as, immediately after the system on a chip 300 is started up ("power-on reset"), to allow a part of the debug system that is integrated in the system on a chip 300, e.g the so-called multicore debug system (MCDS) 444 and the debug interface 446 (the multicore debug system 444 and the debug interface 446 are referred to jointly as "debug component" 330 in FIG. 3), to stipulate access permissions for accessing the plurality of processor cores ("application CPUs") 332. Furthermore, the further processor core 334 may be designed to use the MCDS 444 to enable trace sources for use (granting a read permission) or to deny them (see 462 and FIG. 5, tables d), e) and f)). Next, the selected trace source configuration can be locked by the further processor core 334 by means of the MCDS 444 ("lock", see 464 and FIG. 5, table g)), i.e. protected against alteration before the system on a chip 300 is reset again.

Figure 5:
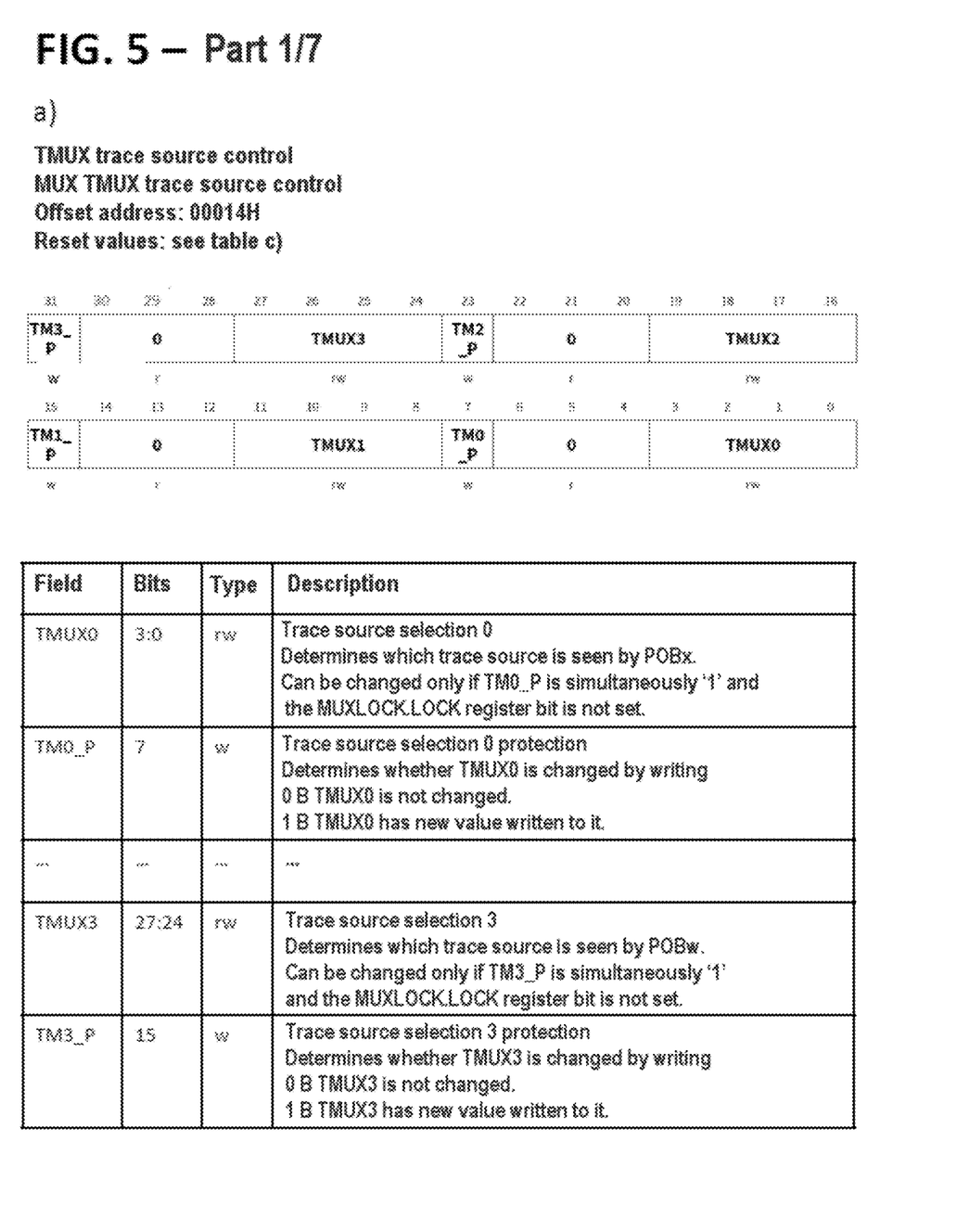
FIG. 5 shows an example register of a system on a chip, in accordance with various aspects described.

The permissions can be stipulated and locked by writing to registers, which are described by way of illustration in FIG. 5.

The at least one register can for example comprise at least one lock bit that can be set to a basic state during the reset and can be changed to a predetermined state once by means of the debug configuration software. The debug setting may be unalterable if the lock bit is in the predetermined state.

In various other examples, the debug setting may be alterable only by a trusted master after the debug configuration software has been terminated. The trusted master can be a hardware bus master of the hardware security module, for example.

To manage the access permissions, in various examples, the system on a chip 300 may be equipped with at least one so-called access protection unit (APU), which for example can grant or deny in the aforementioned registers the access rights (read/write) for each master and/or slave inside the system on a chip 300 and (e.g., via externally accessible interfaces) outside the system on a chip 300. By way of example, all bus connection slave interfaces can have access protection units that allow access permissions to be assigned for read or write access. A granularity of the access permissions may be available on a VM basis, for example, and protected by means of hardware.

The debugger 102 may be a master that is allowed read access to trace sources and, if necessary, write access for trace configurations (e.g., to filter settings, trigger points, and so on).

In the example shown in FIG. 3, the system on a chip 300 may be designed such that the second virtual machine VM2 (or the software installed thereon) is debugged and the first virtual machine VM1 is meanwhile protected against access by the debugger 102.

This means, inter alia, that software installed on the first virtual machine VM1, or on the second virtual machine VM2, is started only after the debug configuration software (e.g., first debug instructions), and only then is the debug software (e.g., second debug instructions) started, but no earlier than when the first user code instruction is executed, which is delayed until the protective mechanisms have been installed using the debug configuration software. Only then is the debug software of the debugger 102 actually executed.

In various examples, a data misuse protection system for protecting memories and peripheral modules, or peripheral circuits, of the virtual machine to be protected (in the example this is VM1) may be configurable, for example based on a property concerning whether or not access by the debugger 102 is permitted.

In the example from FIG. 3, it is possible for the debugger 102 to be only allowed to access peripheral devices, peripheral circuits and memories that belong to the second virtual machine VM2, for example.

The permitted access can be read access, for example. This can mean that a tracing can be executed while the software of the second virtual machine VM2 is being executed. This can certainly mean that the debug opportunities are restricted, for example because single stepping etc. is not accessible, but rather only information that is available by means of read access to VM2 resources and traceable activities and trace infrastructure of the VM2 can be obtained. However, this limitation (write access to the second virtual machine VM2 to be debugged is not permitted either) can allow the data security for the first virtual machine VM1 (or more generally: for the virtual machine(s) to be protected).

In other words, it is guaranteed that the debugger 102 (e.g., processor core executing the second debug instructions) cannot introduce code into the virtual machine to be debugged (here VM2) (and naturally also not into the virtual machine(s) to be protected, here VM1), but rather that the virtual machine to be debugged (here VM2) is merely observed (e.g by means of tracing) during debugging.

This means that a malicious attacker also does not have the opportunity to introduce code into the protected virtual machines (here: VM1) or into the virtual machine to be debugged (here: VM2).

In various examples, the trace functions can be configured after permissions are stipulated (at 468). This permission can be granted to the debugger 102. The trace functions can relate to a filter configuration, trigger points or the like, for example, and be limited to those traces for which a read permission is available, in the illustrative case from FIG. 3 that is to say e.g. the traces that relate to the second virtual machine VM2.

In other words, the system on a chip 300 according to various examples may be configured such that the registers, peripheral modules and memories to which the debug system 102 has access are adjustable in fine-grained fashion.

Should the result of the debug process be that a change to the software of the virtual machine to be debugged (the VM2) is necessary, this can be effected offline, for example, and the changed software can be supplied to the system on a chip 300 (here to the second virtual machine VM2) by means of the privileged user at a later time.

In various examples, the further processor core 334 may be designed such that the access permissions to be granted (or denied) are hard coded in the software and cannot be influenced.

By way of example, the privileged software (e.g., the first debug instructions) can run first, adjust the multiplexer registers (that is to say e.g. which sources are supposed to be traceable by which of the virtual machines VM), set bits for freezing the setting (the privileged software cannot subsequently change them again either), and then start the software of the virtual machine VM to be debugged. The debug software (e.g., second debug instructions) executed by the debugger 102, can change everything that is accessible (as far as in particular tracing functionalities such as filters, trigger points, etc., are concerned), but in particular no longer the register entries/bits set by the privileged software, and also no code in the virtual machines VM.

That is to say that the setting to be made may be provided as part of the debug configuration software in various examples, e.g. as part of the first debug instructions or as stored data.

In further examples, the privileged software (the debug configuration software or first debug instructions) can run first and may be designed to obtain the setting to be made from a source outside the system on a chip 300 as data generated by means of an authenticated method and to authenticate said setting. The privileged user can provide the setting to be made, for example.

Primary debug functions during the integration phase described herein relate to an observation (the tracing) for a further analysis. As described above, these functions are provided by the MCDS trace system 444 (in cooperation with the debug interface 446 and the debugger 102), only the virtual machine VM (here: VM2) on which the application to be debugged is installed comprising observation points enabled for read access.

The registers in which the trace configuration can be set are shown in FIG. 5 by way of illustration with fields, bits, types, descriptions, and so on. For the sake of clarity, this information is not repeated here. In one example, the register is configured to store read and write permissions for respective address ranges relating to respective virtual machines, and access to memory associated with various virtual machines is controlled by selectively storing read and/or write permissions to various address ranges in the register.

For example, read and write permission for address ranges associated with VM2 (the VM being debugged) while read and write permission may not be stored for address ranges relating to VM1 (the VM to which access is to be blocked).

State and signal traces may also be hard coded or flexibly configurable, depending on a protection setting of the applicable peripheral module, or peripheral circuit.

In various examples, it may be sufficient to allow only a tracing for debugging.

In further examples, it may be advantageous to provide a limited flow control functionality, for example stopping of the running processes by means of a trigger condition that can be set by means of the MCDS 444. This can provide the opportunity to allow a further analysis of peripheral modules or peripheral circuits or data in memories in the selected state.

In a configuration of the system on a chip 300 with the most comprehensive limitation, the setting may be chosen such that the debugger 102 is allowed to access only the MCDS 444 and memories in which traces are stored.

In a configuration of the system on a chip 300 with less comprehensive limitations, the setting may be chosen such that access by the debugger 102 (which may be identifiable as bus master, example) is provided with the same access rights (e.g., read rights) to memory and peripheral devices, or peripheral circuits, as the application to be debugged, and, if necessary, to further memories of the selected virtual machine (e.g. VM2), e.g. local RAMs or the like. This can be made possible by providing at least one area of the APU for a specific access path for debugging, for example.

Although the description concentrates on the use of multiple virtual machines VM1, VM2, examples can also be used if two or more applications (without different virtual machines being involved) use different processors.

Figure 6:
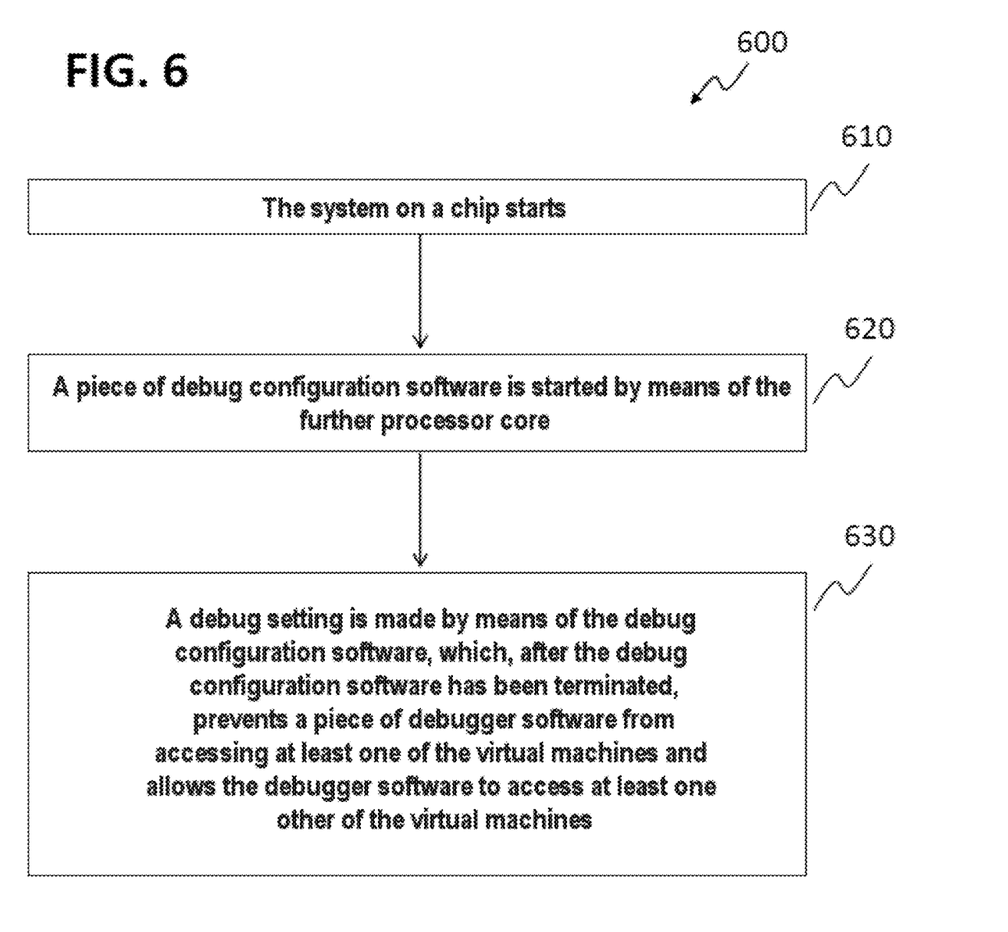
FIG. 6 shows a flowchart of an example method for operating a system on a chip, in accordance with various aspects described.

FIG. 6 shows a flowchart for a method for operating a system on a chip that comprises a plurality of processor cores having a plurality of virtual machines and a further processor core, in a debug mode according to various examples.

The method can comprise starting the system on a chip (at 610), starting a piece of debug configuration software (e.g., executing first debug instructions) by means of the further processor core (at 620) and making a debug setting which, after the debug configuration software has been terminated (e.g., the first debug instructions have been executed), prevents a piece of debugger software (e.g., a processor core executing second debug instructions) from accessing at least one of the virtual machines and allows the debugger software (e.g., a processor core executing second debug instructions) to access at least one other of the virtual machines (at 630).

A few examples are specified in summary below.

Example 1 is a system on a chip (SOC), configured to be operated in a debug mode, including a plurality of processor cores including a plurality of virtual machines; and a further processor core, configured to, in the debug mode, initially execute first debug instructions after the system on a chip has started operating. The first debug instructions are configured to cause the further processor core to make a debug setting that, after the first debug instructions are executed, prevents a processor core executing second debug instructions from accessing at least one of the virtual machines and allows the processor core executing the second debug instructions to access at least one other of the virtual machines.

Example 2 includes the subject matter of example 1, including or omitting optional subject matter, wherein the access to the at least one other of the virtual machines is read access to trace data of a trace infrastructure.

Example 3 includes the subject matter of example 1, including or omitting optional subject matter, wherein the debug setting is provided as part of the first debug instructions or as stored data.

Example 4 includes the subject matter of example 1, including or omitting optional subject matter, wherein the first debug instructions are configured to cause the further processor core to obtain the debug setting from a source outside the system on a chip as data generated by an authenticated method, and authenticate the debug setting.

Example 5 includes the subject matter of example 1, including or omitting optional subject matter, wherein the further processor core is a hardware security module (HSM).

Example 6 includes the subject matter of example 1, including or omitting optional subject matter, wherein the debug setting is unalterable after the first debug instructions have been executed.

Example 7 includes the subject matter of example 1, including or omitting optional subject matter, wherein the debug setting is alterable only by a trusted master after the first debug instructions have been executed.

Example 8 includes the subject matter of example 7, including or omitting optional subject matter, wherein the further processor core is a hardware security module (HSM); and the trusted master is a hardware bus master of the hardware security module.

Example 9 includes the subject matter of example 1, including or omitting optional subject matter, further including at least one register for storing the debug setting.

Example 10 includes the subject matter of example 9, including or omitting optional subject matter, wherein only a trusted master is permitted to write to the at least one register.

Example 11 includes the subject matter of example 9, including or omitting optional subject matter, wherein the at least one register includes at least one lock bit that can be set to a basic state during reset and can be changed to a predetermined state once by the further processor core executing the first debug instructions; and wherein the debug setting is unalterable if the lock bit is in the predetermined state.

Example 12 includes the subject matter of example 9, including or omitting optional subject matter, wherein the at least one register is configured to store read and write permissions for respective address ranges relating to respective virtual machines, further wherein the register does not store read and write permission for an address range relating to the at least one of the virtual machines.

Example 13 includes the subject matter of example 9, including or omitting optional subject matter, wherein the at least one register is configured to store read and write permissions for respective address ranges relating to respective virtual machines, further wherein the register stores read and write permission for an address range relating to the at least other one of the virtual machines.

Example 14 is a method for operating a system on a chip, which includes a plurality of processor cores having a plurality of virtual machines and a further processor core, in a debug mode, the method including: starting the system on a chip; executing first debug instructions with the further processor core to make a debug setting; wherein the debug setting, after the first debug instructions have been terminated, prevents a processor core of the plurality of processor cores executing second debug instructions from accessing at least one of the virtual machines and allows the processor core of the plurality of processor cores executing the second debug instructions to access at least one other of the virtual machines.

Example 15 includes the subject matter of example 14, including or omitting optional subject matter, wherein the access to the at least one other of the virtual machines is read access to trace data of a trace infrastructure.

Example 16 includes the subject matter of example 14, including or omitting optional subject matter, wherein the debug setting is provided as part of the first debug instructions or as stored data.

Example 17 includes the subject matter of example 14, including or omitting optional subject matter, further including receiving the debug setting from a source outside the system on a chip as data generated by an authenticated method; and authenticating the debug setting.

Example 18 includes the subject matter of example 14, including or omitting optional subject matter, wherein the further processor core is a hardware security module (HSM).

Example 19 includes the subject matter of example 14, including or omitting optional subject matter, wherein the debug setting is unalterable after the first debug instructions have been executed.

Example 20 includes the subject matter of example 14, including or omitting optional subject matter, wherein the debug setting is alterable only by a trusted master after the first debug instructions have been executed.

Example 21 includes the subject matter of example 20, including or omitting optional subject matter, wherein the further processor core is a hardware security module (HSM); and the trusted master is a hardware bus master of the hardware security module.

Example 22 includes the subject matter of example 14, including or omitting optional subject matter, further including storing the debug setting in at least one register.

Example 23 includes the subject matter of example 22, including or omitting optional subject matter, wherein only a trusted master is authorized to execute the first debug instructions to write to the at least one register.

Example 24 includes the subject matter of example 22, including or omitting optional subject matter, wherein the at least one register includes at least one lock bit that can be set to a basic state during reset and can be changed to a predetermined state once by the further processor core executing the first debug instructions; and wherein the debug setting is unalterable if the lock bit is in the predetermined state.

Example 25 includes the subject matter of example 22, including or omitting optional subject matter, further including: refraining from storing, in the register, read and write permission for an address range relating to the at least one of the virtual machines.

Example 26 includes the subject matter of example 22, including or omitting optional subject matter, further including storing, in the register, read and write permission for an address range relating to the at least one other of the virtual machines.

Further advantageous configurations of the apparatus can be obtained from the description of the method, and vice versa.

The invention claimed is:
1. A system on a chip (SOC), configured to be operated in a debug mode, comprising:
   a plurality of processor cores comprising a plurality of virtual machines; and a further processor core, configured to, in the debug mode, initially execute first debug instructions after the system on a chip has started operating;
wherein the first debug instructions are configured to cause the further processor core to make a debug setting that, after the first debug instructions are executed, sets at least one hardware-based lock to prevent a processor core executing second debug instructions from accessing at least one of the virtual machines, wherein, after being set, the at least one hardware-based lock is unalterable until the SoC is reset.

2. The system on a chip of claim 1,
wherein the access to the at least one other of the virtual machines is read access to trace data of a trace infrastructure.

3. The system on a chip of claim 1,
wherein the debug setting is provided as part of the first debug instructions or as stored data.

4. The system on a chip of claim 1, wherein the first debug instructions are configured to cause the further processor core to
obtain the debug setting from a source outside the system on a chip as data generated by an authenticated method, and
authenticate the debug setting.

5. The system on a chip of claim 1,
wherein the further processor core is a hardware security module (HSM).

6. The system on a chip of claim 1,
wherein the debug setting is alterable only by a trusted master after the first debug instructions have been executed.

7. The system on a chip as claimed in claim 6, wherein the further processor core is a hardware security module (HSM); and
the trusted master is a hardware bus master of the hardware security module.

8. The system on a chip of claim 1, further comprising:
at least one register for storing the debug setting.

9. The system on a chip of claim 8,
wherein only a trusted master is permitted to write to the at least one register.

10. The system on a chip of claim 8,
wherein the at least one register comprises at least one lock bit that can be set to a basic state during reset and can be changed to a predetermined state once by the further processor core executing the first debug instructions; and
wherein the debug setting is unalterable if the lock bit is in the predetermined state.

11. The system on a chip of claim 8,
wherein the at least one register is configured to store read and write permissions for respective address ranges relating to respective virtual machines, further wherein the register does not store read and write permission for an address range relating to the at least one of the virtual machines.

12. The system on a chip of claim 8,
wherein the at least one register is configured to store read and write permissions for respective address ranges relating to respective virtual machines, further wherein the register stores read and write permission for an address range relating to the at least other one of the virtual machines.

13. A method for operating a system on a chip, which comprises a plurality of processor cores having a plurality of virtual machines and a further processor core, in a debug mode, the method comprising:
starting the system on a chip; and
executing first debug instructions with the further processor core to set a hardware-based lock that, after being set, is unalterable until the system on a chip is reset;
wherein the hardware-based lock, after the first debug instructions have been terminated, prevents a processor core of the plurality of processor cores executing second debug instructions from accessing at least one of the virtual machines and allows the processor core of the plurality of processor cores executing the second debug instructions to access at least one other of the virtual machines.

14. The method of claim 13,
wherein the access to the at least one other of the virtual machines is read access to trace data of a trace infrastructure.

15. The method of claim 13,
wherein the setting of the hardware-based lock is caused by execution of the first debug instructions.

16. The method of claim 13,
wherein the further processor core is a hardware security module (HSM).

17. The method of claim 13,
wherein the hardware-based lock is alterable only by a trusted master after the first debug instructions have been executed.

18. The method of claim 17, wherein
the further processor core is a hardware security module (HSM); and
the trusted master is a hardware bus master of the hardware security module.

19. The method of claim 13, further comprising setting the hardware-based lock by writing at least one bit in at least one register.

20. The method of claim 19,
wherein only a trusted master is authorized to execute the first debug instructions to write to the at least one register.

21. The method of claim 19,
wherein the at least one register comprises at least one lock bit that can be set to a basic state during reset and can be changed to a predetermined state once by the further processor core executing the first debug instructions; and
wherein the at least one bit is unalterable if the lock bit is in the predetermined state.

22. The method of claim 19, further comprising:
refraining from storing, in the register, read and write permission for an address range relating to the at least one of the virtual machines.

23. The method of claim 19, further comprising:
storing, in the register, read and write permission for an address range relating to the at least one other of the virtual machines.

24. A system on a chip (SOC), configured to be operated in a debug mode, comprising:
a plurality of processor cores comprising a plurality of virtual machines; and
a further processor core, configured to, in the debug mode, initially execute first debug instructions after the system on a chip has started operating; and
at least one register for storing a debug setting, wherein the at least one register comprises at least one lock bit that can be set to a basic state during reset and can be changed to a predetermined state once by the further processor core executing the first debug instructions, further wherein the debug setting is unalterable if the lock bit is in the predetermined state;

wherein the first debug instructions are configured to cause the further processor core to store a debug setting in the at least one register that, after the first debug instructions are executed, prevents a processor core executing second debug instructions from accessing at least one of the virtual machines and allows the processor core executing the second debug instructions to access at least one other of the virtual machines.

25. The system on chip of claim 24, wherein only a trusted master is permitted to write to the at least one register.

26. The system on chip of claim 24, wherein the at least one register is configured to store read and write permissions for respective address ranges relating to respective virtual machines.

* * * * *